Patented Nov. 2, 1948

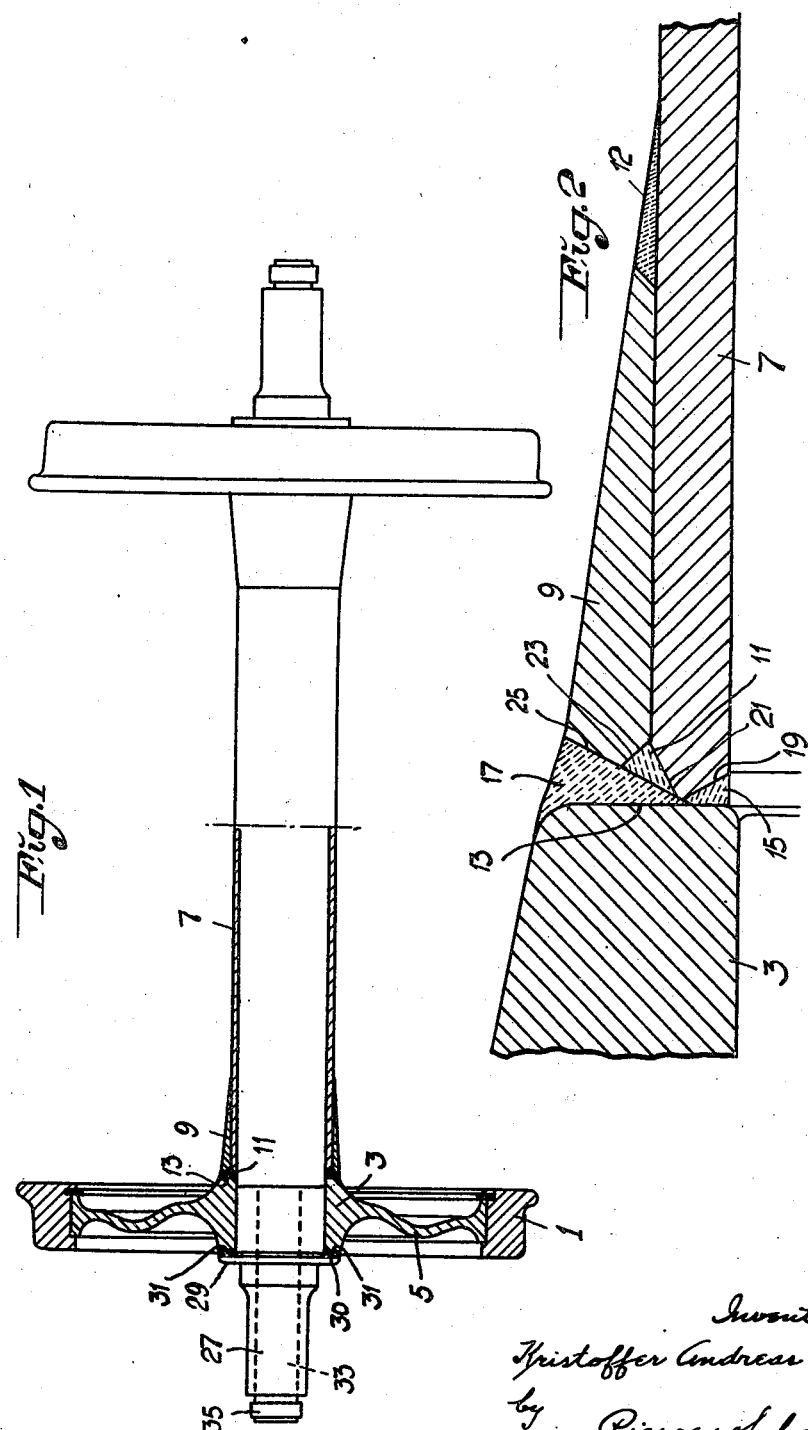

2,452,659

UNITED STATES PATENT OFFICE 2,452,659

CAR WHEEL ASSEMBLY

Kristoffer Andreas Huldt, Stockholm, Sweden
Application August 20, 1943, Serial No. 499,418
In Sweden June 26, 1942

Section 1, Public Law 690, August 8, 1946
Patent expires June 26, 1962

6 Claims. (Cl. 295—36)

The present invention relates to a car wheel assembly, particularly for railway cars. The primary object of the invention is to improve the hitherto used construction of a solid one-piece axle which at the ends is formed to journals and on which the wheels are secured by pressing their hubs onto the axle. This method of connection results in maximum stresses acting in a radial plane through the inner side face of the hub, and the cross-section of the axle at this plane should therefore be somewhat greater than necessary to meet design requirements for bending moments only. Since car wheel axles of hitherto known construction are usually of uniform thickness, they are over-dimensioned along a great portion of the length, which results in waste of material and an increase of the weight of the wheel assembly. For economical reasons, the axle, generally, cannot be given sufficiently large diameters. As a consequence thereof, axle fractures occur frequently, the point of fracture being in most cases located in the above-named section through the inner side of the wheel hub.

An object of the invention is to provide a relatively light weight car wheel assembly that eliminates or reduces the objectionable features of the prior constructions. An object is to provide a car wheel assembly that does not set up a stress concentration in the plane of the inner face of the car wheel hub. These and other objects and advantages of the invention are attained by a novel construction of the axle and hub assembly, a suitable embodiment of which is illustrated in the accompanying drawing, in which:

Fig. 1 shows a car wheel assembly partly in section, and

Fig. 2 shows, to an enlarged scale, the welded joint between the axle and the hub.

In the drawing, numeral 1 denotes the wheel tire and numeral 3 the hub. The tire is secured to the hub by means of a disc 5 integral with the hub. While I have shown a disc 5 for connecting the tire with the hub, it will be obvious that this connection may be effected in any suitable manner, such as by means of spokes. The members described above are of known and standardized construction and dimensions.

The axle which connects the two wheels consists of a cylindrical tube 7 of uniform thickness. The inner diameter of the tube is equal to or slightly larger than the inner diameter of the hub. At each end of the tube 7 there is secured a sleeve 9 which tightly fits the outer periphery of the tube 7 and is secured thereto by means of welds 11 and 12 forming an axle member having end portions of increased wall thickness. Each end of the axle member is butt welded to the inner end face 13 of the hub by means of two welds 15 and 17 made from within and from without, respectively. The total wall thickness of the axle member comprising the tube 7 and the sleeve 9 at the joint is substantially equal to the thickness of the hub at this place so as to obtain a continuous joint between the hub and the axle member, the thickness decreasing continuously towards the middle of the axle. Due to this construction, the formation of cracks is avoided.

The ends of the tube 7 and the sleeve 9 are bevelled as at 19, 21, 23 and 25, in order to facilitate the welding operation.

The journals 27 of the axle extend at their inner greater portions into the hubs 3 near the inner end face 13 of the same. Each journal is provided with a collar 29 which by means of a weld 30 is connected with the outer vertical side face 31 of the appertaining hub. Due to this arrangement, each journal is secured against axial displacement and need not be press fitted into the hub, as is the case in hitherto used constructions comprising one-piece axles. The inner end of each journal 27 fits exactly the inner diameter of the hub or may be merely slightly greater so that small radial forces only will occur due to the journals being pressed into the hubs. On account of the connection described, the journals are obviously entirely independent of the axle and do not produce additional stresses on the connection between the axle and the hubs.

In order to reduce the weight of the journals they may be provided with central bores 33 closed by plugs 35. If desired, the length of each journal may be somewhat greater than that shown in the drawing so that each journal extends somewhat into the tube 7.

In the manufacture of the car wheel assembly described above, the sleeve 9 is welded to the axle tube 7 by filling the angular space between the bevelled faces 21 and 23 with the welding material 11 in a manner such that the end of the tube is approximately given the shape of two intersecting conical faces. The weld 12 is made either before or after the application of the weld 11. The tube 7 is then placed into the correct position relative to the hub, and both the wheel and the axle are rotatably mounted so that they can be turned without changing their mutual position. Then, the weld 15 is applied between the bevelled face 19 and the side face 13 of the hub by introducing the welding electrode through the hub. The wheel and the axle are rotated as the welding operating proceeds, in a manner such that the welding is always effected substantially at the lowermost portion. Thereupon, the outer weld 17 between the side face 13 of the hub, the bevelled face 25 and the adjoining face of the weld 11 is effected. The weld 17 may be made prior to making the weld 15.

Thereupon, the journal 27 is introduced into the hub, and the collar 29 is welded to the outer side face of the hub.

In a similar manner, the second wheel is secured to the axle.

The invention may be applied not only in connection with the manufacture of car wheel assemblies but also in repairing or exchanging existing assemblies of the type indicated in the beginning of this specification. In the latter case, the solid one-piece axle is cut off at the sections located at the inner side face of the hub and is replaced by a tube which is secured to the inner faces of the hubs in the manner described above. In this case, the existent journals may be maintained without alteration.

It will be understood that the invention may be applied not only in connection with railway cars and tram cars but also to other kinds of land vehicles, for instance to vehicles provided with pneumatic tire wheels.

What I claim is:

1. In a car wheel assembly, a hollow axle of uniform wall thickness, a wheel hub welded to said axle, and sleeves welded to wheel hubs and surrounding said axle at the ends thereof and welded thereto, the outer diameter of said sleeves increasing towards the ends of said axle.

2. In a car wheel assembly, a hollow axle of uniform wall thickness, a conical sleeve fitted upon an end of the axle and welded thereto, the outer diameter of the sleeve increasing towards the end of the axle, a wheel hub having an inner diameter substantially equal to the inner diameter of said axle, and weld metal forming a butt connection of the inner side surface of the wheel hub to the adjacent end surfaces of the axle and sleeve, the maximum diameter end of the sleeve being approximately equal to the diameter of the hub at its inner surface and the weld metal forming a smoothly tapering connection of the hub to the sleeve.

3. In a car wheel assembly, the invention as recited in claim 2, wherein the outer ends of the sleeve and of the axle are each beveled from their inner and outer surfaces, the adjacent beveled portions of the sleeve and axle forming an annular recess to facilitate the welding of the sleeve to the axle.

4. In a car wheel assembly, the invention as recited in claim 2, in combination with a journal having an inner end extending into and snugly fitting said hub, and means preventing axial displacement of said journal with respect to said hub, said means consisting substantially exclusively of weld metal uniting said journal to the outer side surface of said hub, whereby the connection between the journal and the hub introduces no radial stresses at the butt-welded union of the hub and axle.

5. A car wheel and axle assembly comprising a tubular axle member, a tubular wheel hub, said axle member and hub having substantially the same internal diameter, said hub having the inner end face thereof coaxial with and disposed in end to end abutting relation with an end of said axle member said abutting ends being welded to each other and a journal member extending into the outer end of said wheel hub and including a part abutting the outer end surface of said hub and welded thereto.

6. A car wheel and axle assembly comprising a tubular axle member, a tubular wheel hub, said axle member and hub having substantially the same internal diameter, said hub having the inner end face thereof coaxial with and disposed in end to end abutting relation with an end of said axle member said abutting ends being welded to each other and a journal member extending into said hub from the outer end thereof and being dimensioned substantially exactly to fit the bore of said hub whereby to avoid the creation of internal stresses in said members, said journal member having a collar abutting the end surface of said hub and welded thereto.

KRISTOFFER ANDREAS HULDT.

REFERENCES CITED

The following references are of record in the file of this patent:

UNITED STATES PATENTS

| Number | Name | Date |
|---|---|---|
| 293,201 | Stewart | Feb. 5, 1884 |
| 1,357,226 | Davis | Nov. 2, 1920 |
| 1,993,430 | Bell | Mar. 5, 1935 |

FOREIGN PATENTS

| Number | Country | Date |
|---|---|---|
| 12,122 | Great Britain | A. D. 1848 |
| 251,380 | Great Britain | May 6, 1926 |
| 352,229 | Great Britain | July 9, 1931 |
| 639,418 | Germany | Dec. 4, 1936 |

OTHER REFERENCES

Welding Encyclopedia, 1938, p. 514, published by The Welding Eng. Pub. Co., Chicago, Illinois.